Figure 1:
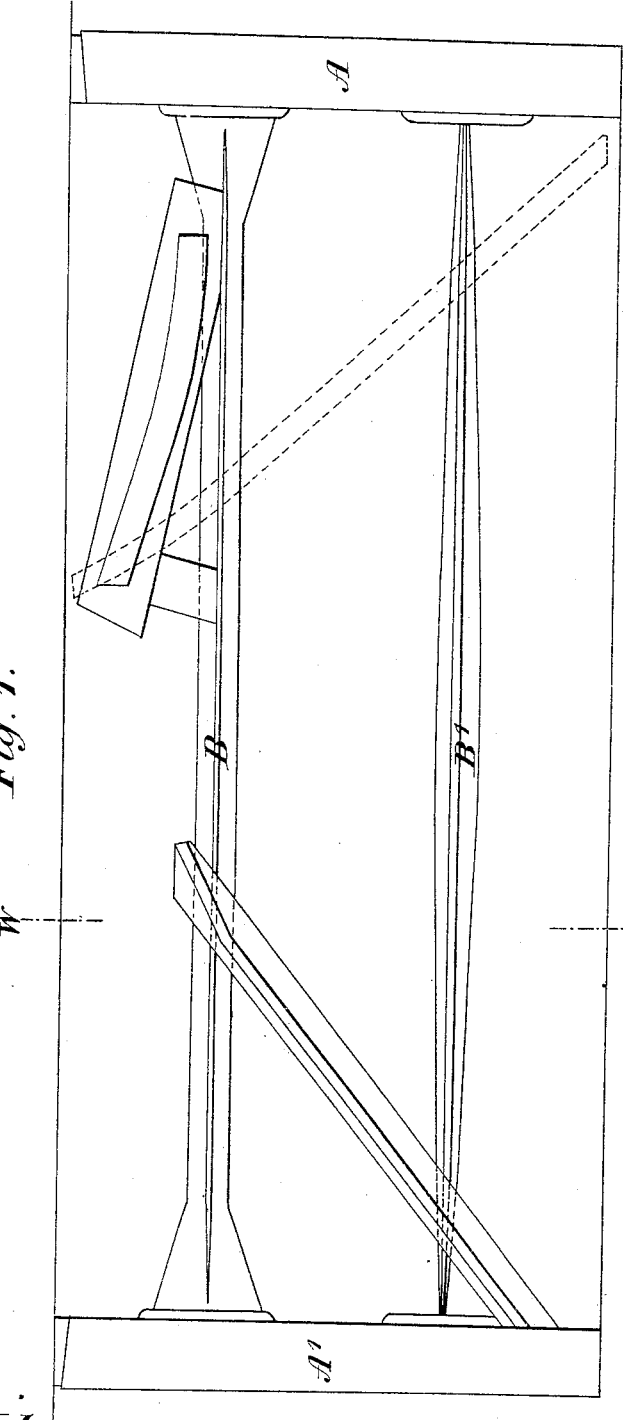

(No Model.)  8 Sheets—Sheet 1.
W. H. SQUIRE.
PIANO FORTE.

No. 265,172.  Patented Sept. 26, 1882.

Witnesses:
J. A. Rutherford
Lee S. Hyer

Inventor:
William H. Squire
By James L. Norris,
Atty (No Model.)
8 Sheets—Sheet 2.
W. H. SQUIRE.
PIANO FORTE.
No. 265,172.
Patented Sept. 26, 1882.
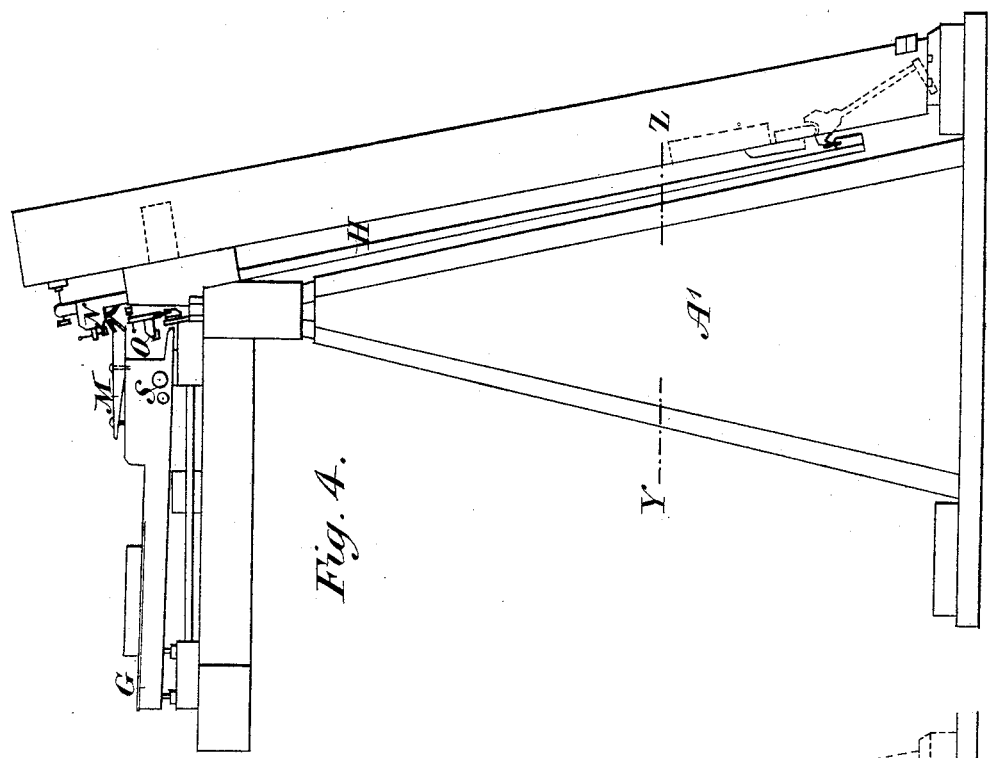
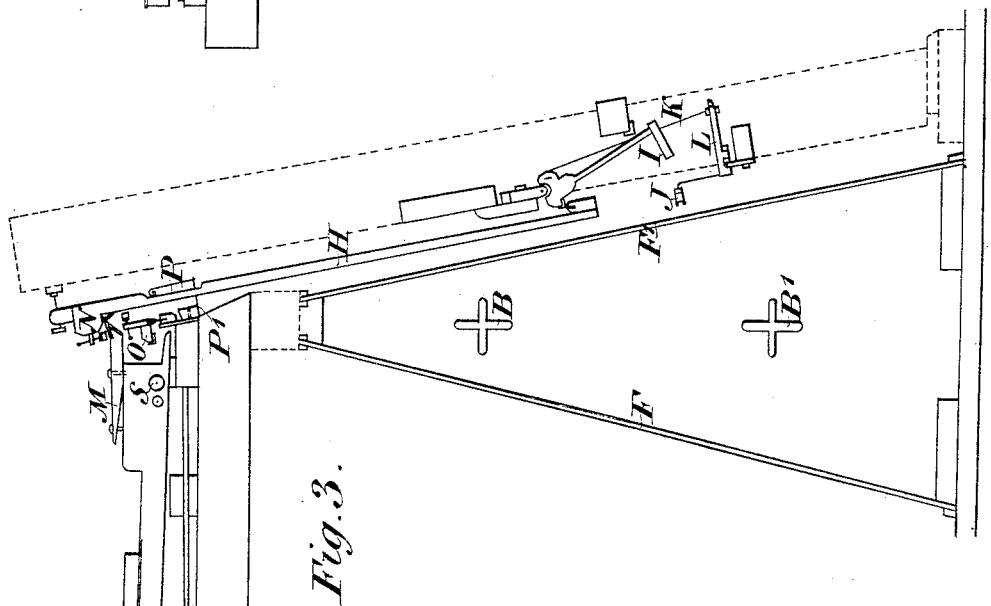
Witnesses:
J. A. Rutherford
C. S. Hyer
Inventor:
William H. Squire
By James L. Norris.
Atty (No Model.)  
W. H. SQUIRE.  
PIANO FORTE.

No. 265,172. Patented Sept. 26, 1882.

Witnesses:  
J. A. Rutherford  
C. S. Hyer

Inventor  
William H. Squire.  
By James L. Norris.  
Atty (No Model.) 8 Sheets—Sheet 5.
W. H. SQUIRE.
PIANO FORTE.

No. 265,172. Patented Sept. 26, 1882.

Witnesses:
J. A. Rutherford
C. S. Hyer

Inventor:
William H. Squire
By James L. Norris.
Atty (No Model.) 8 Sheets—Sheet 6.

W. H. SQUIRE.
PIANO FORTE.

No. 265,172. Patented Sept. 26, 1882.

Witnesses:
J. A. Rutherford
C. Sittyer

Inventor:
William H. Squire.
By James L. Norris,
Atty (No Model.)
W. H. SQUIRE.
PIANO FORTE.
No. 265,172.  8 Sheets—Sheet 7.
Patented Sept. 26, 1882.
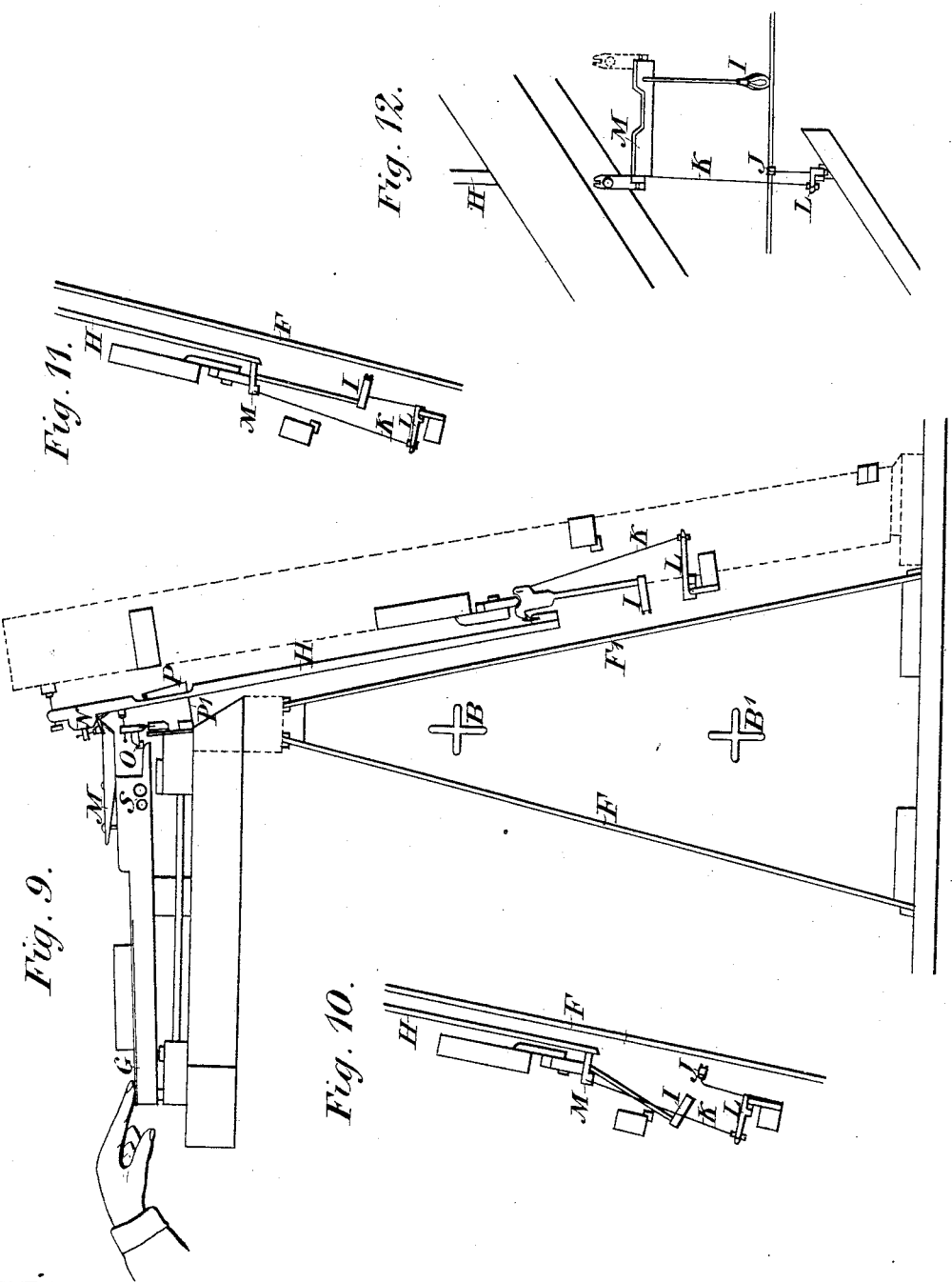
Witnesses:
J. A. Rutherford
Inventor:
William H. Squire.
By James L. Norris.
Atty.

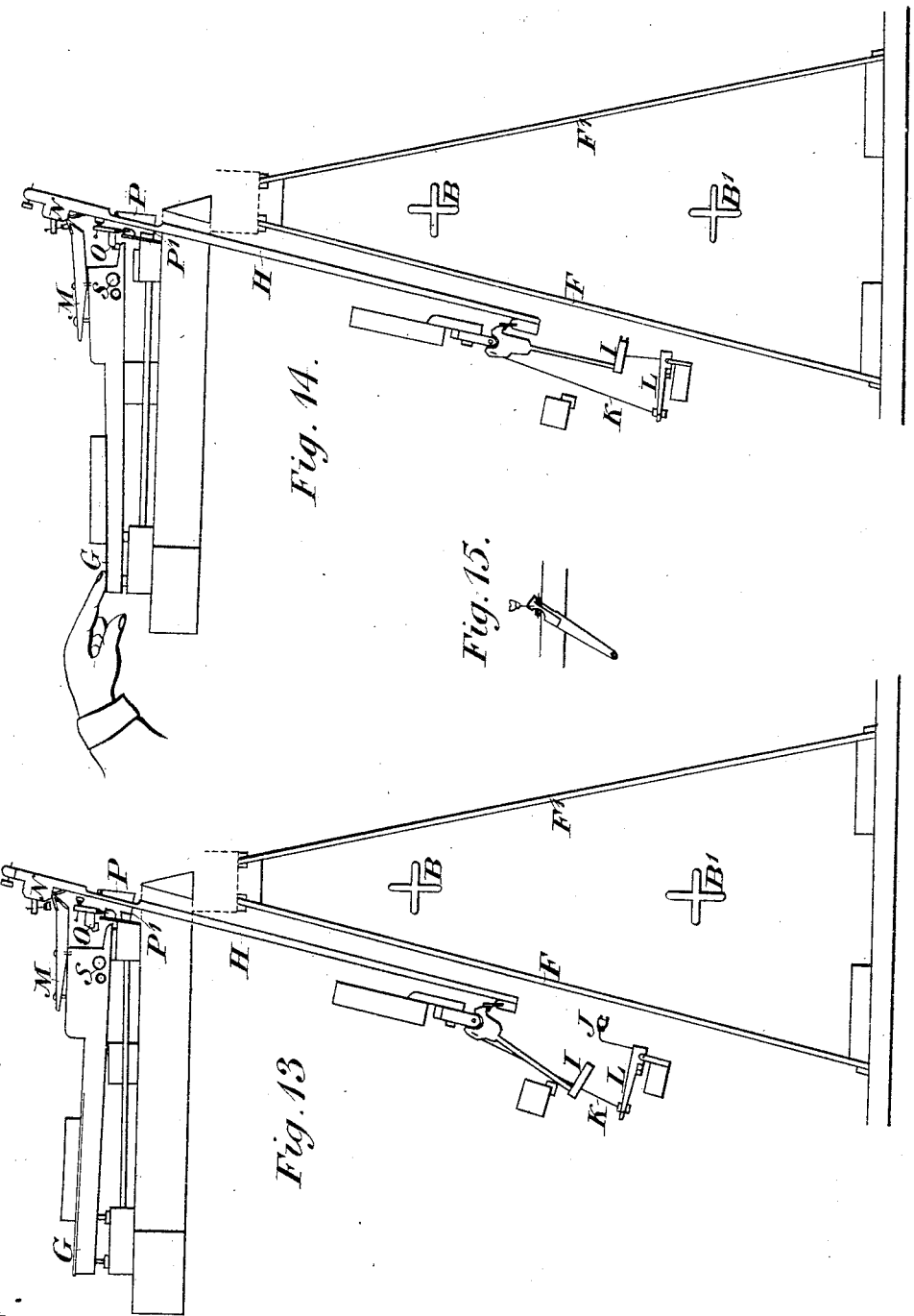

UNITED STATES PATENT OFFICE.

WILLIAM H. SQUIRE, OF CAMDEN TOWN, COUNTY OF MIDDLESEX, ENGLAND.

PIANO-FORTE.

SPECIFICATION forming part of Letters Patent No. 265,172, dated September 26, 1882.

Application filed April 13, 1882. (No model.) Patented in England September 5, 1881, No. 3,860.

*To all whom it may concern:*

Be it known that I, WILLIAM HENRY SQUIRE, a subject of the Queen of Great Britain, residing at 94 Camden Street, Camden Town, in the parish of Saint Pancras, in the county of Middlesex, in the Kingdom of Great Britain, piano-forte maker, have invented certain new and useful Improvements in Piano-Fortes, (for which I have obtained a patent in Great Britain, No. 3,860, bearing date September 5, 1881,) of which the following is a specification.

The object of this invention is to obtain increased strength and portability and a reduction in size and weight as compared with piano-fortes as heretofore usually constructed.

According to my invention I stretch the strings horizontally, or nearly so, along both sides of a frame-work, the planes in which the strings lie being inclined toward each other, so as to be farther apart at bottom than at top; and the frame-work may be made either of wood or metal, or partly of wood and partly of metal, and may be either solid or tubular. The length of the frame-work depends on the length of the strings required, and its height must be sufficient to allow about half the strings to be drawn along each side. The side which faces the player is hereinafter called the "front," and the other is called the "back," of the frame-work. On each side of the frame-work I attach a sounding-board, over the outer side of which I stretch the strings, so that the two sounding-boards are between the two sets of strings, and about half the strings (more or less) are on each sounding-board, so that the strain may be nearly equalized and balanced. I employ additional frame-work to support the key-board and the action in respect of each set of strings, which frame-work is made to rest partly on the top of the previously-described frame-work and partly on legs or other supports.

In constructing instruments in which the sounding-boards are inclined toward each other the keys are all made of uniform length, and the stickers acting on the strings on the back of the frame-work work downward with the lower ends inclined backward—that is, away from the player—while those acting on the strings on the front of the frame-work also work downward, but with their lower ends inclined forward—that is, toward the player—and the inclination of the planes in which the two sets of stickers lie is such that the planes intersect each other in a straight horizontal line lying just behind and above the back ends of the keys.

In order to explain more fully the nature of the said invention and the manner of carrying the same into practical effect, I will describe an instrument which I have constructed in accordance therewith; but I wish it to be understood that I do not intend to confine myself to the materials or dimensions named or to the arrangement or construction of the subsidiary parts, as these admit of considerable variation without departing from my said invention; but this description is given by way of example and to show in what manner my said invention may be carried into practical effect, and for this purpose I shall refer to the accompanying drawings, in which—

Figure 2:
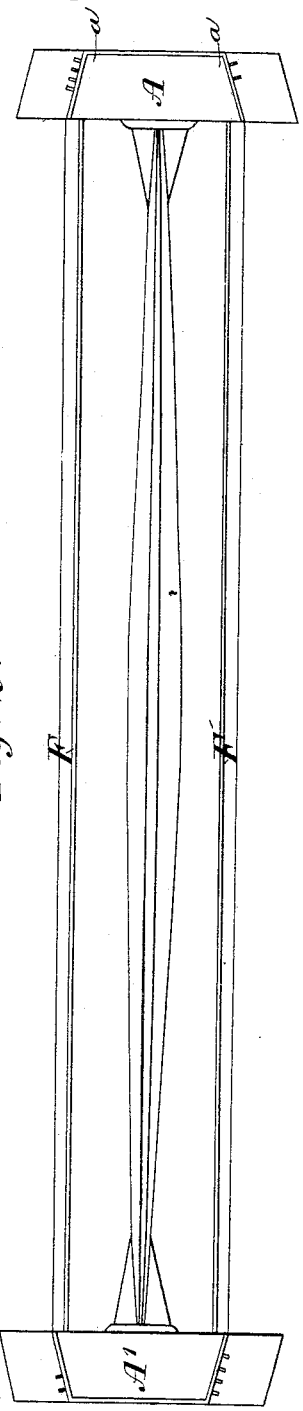
Figure 5:
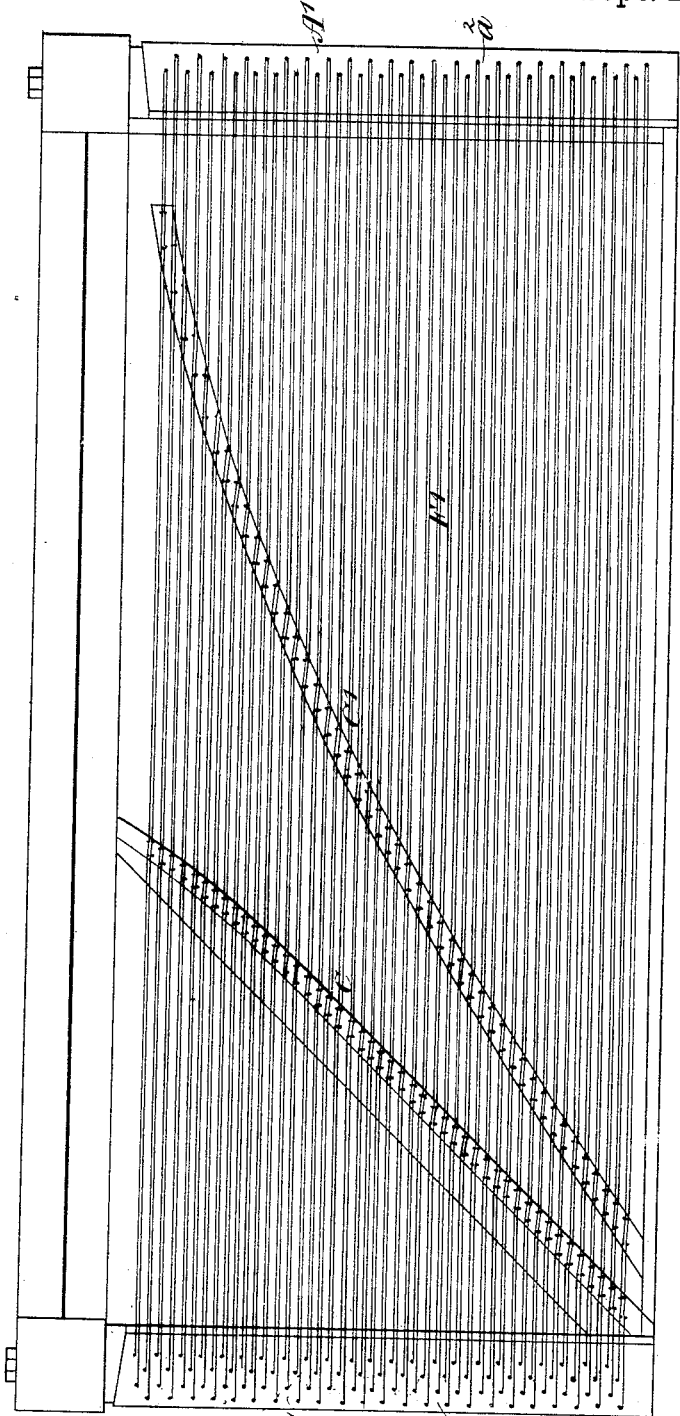
Figure 6:
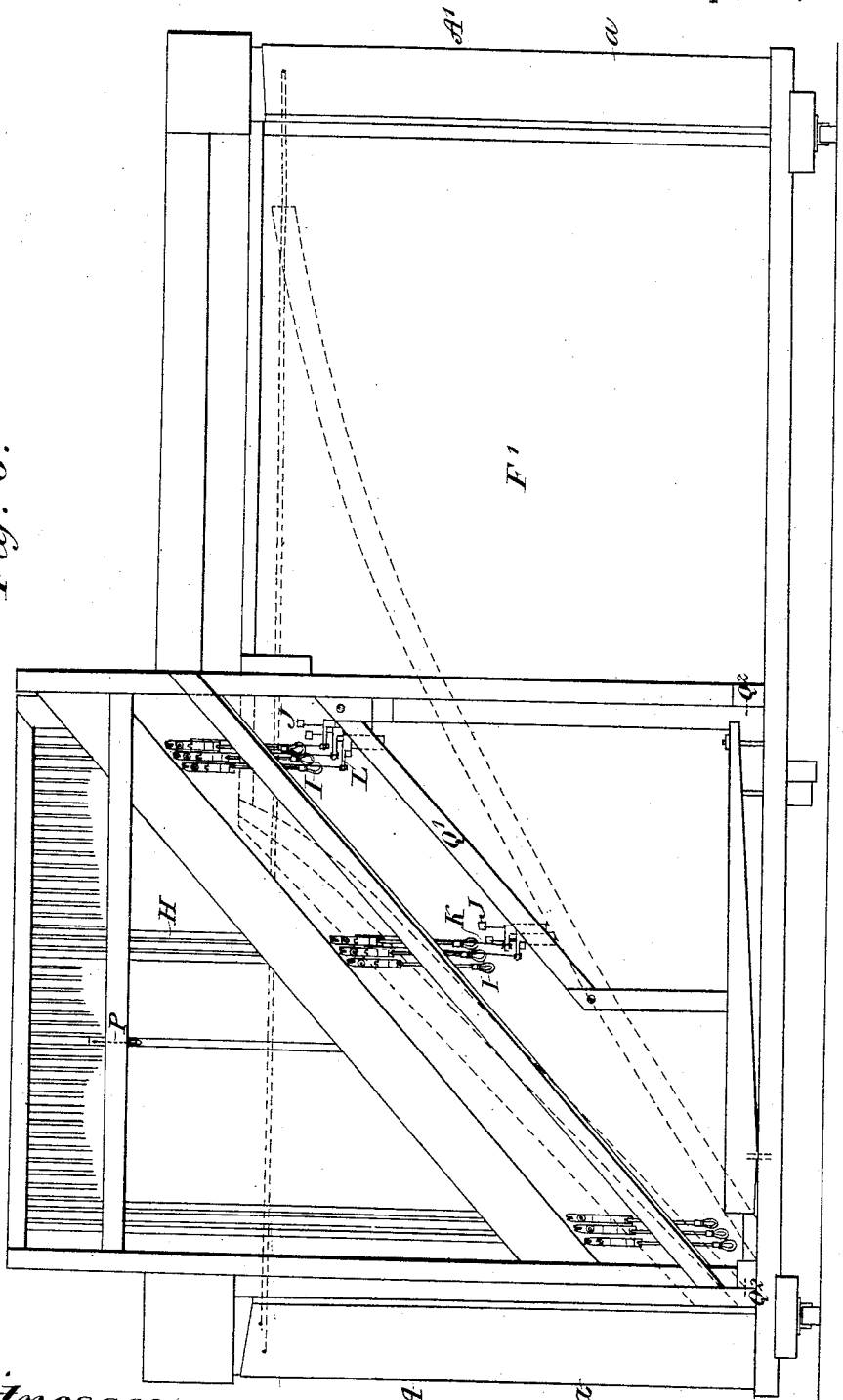
Figure 7:
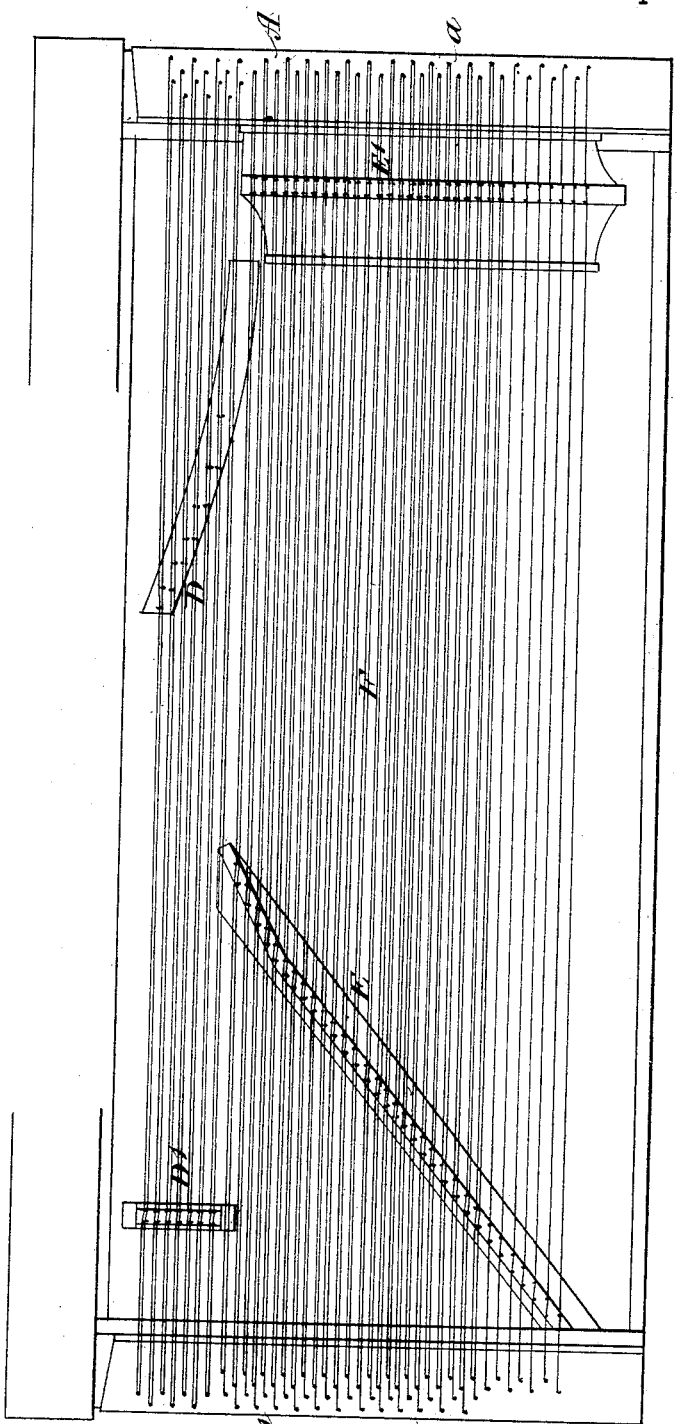
Figure 8:
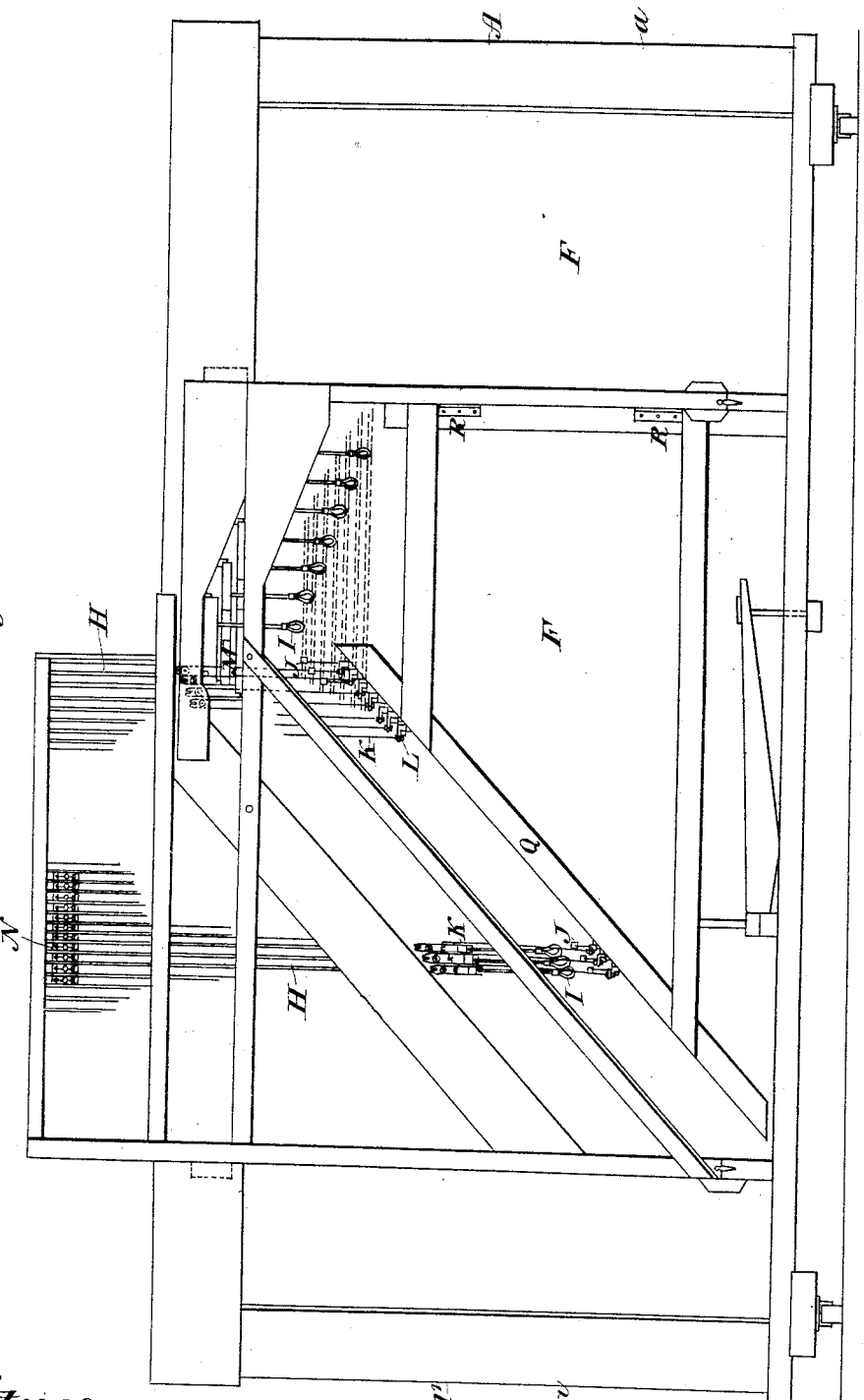

Figure 1 is a vertical longitudinal section of the frame-work. Fig. 2 is a horizontal longitudinal section on the lines Y Z, Fig. 4. Fig. 3 is a transverse vertical section with the section-lines omitted, showing also the action for one note; and Fig. 4 is an end view of the same. Fig. 5 represents the arrangement of the bridges and strings at the back of the instrument. Fig. 6 is a back view of parts of the instrument, with its casing removed to show the action. Fig. 7 represents the arrangement of bridges and strings on the front of the instrument, and Fig. 8 shows the action of the front part, the key-board being removed to allow it to be seen clearly. Figs. 9, 10, 11, 12, 13, 14, and 15 represent details of the action in various parts of the instrument.

The frame-work on which the strings are stretched, and which is shown on Figs. 2, 3, and 4, consists of two nearly-triangular pieces or planks, A A', corresponding with the ordinary wrest-plank and plank for the hitch-pins, preferably of timber of sufficient thickness to bear the strain of the strings, and which thickness may conveniently be about three inches. These pieces or planks may be cased with sheet-iron on the outer side and beveled edges, as shown in the drawings, and are supported at a proper distance from each other by the bars B B', which I prefer should be of iron, and on the beveled edges *a a* of these planks A A′, I place the tuning-pins and hitch-pins, the tuning-pins for the back set of springs being placed on the plank at the right hand of a person sitting at the key-board of the instrument—that is to say, on the plank A, shown on the left hand in Figs. 5 and 6, which are views from the back of the instrument—and the hitch-pins on the plank A′ on right hand of drawing Fig. 5, the tuning-pins for the strings on the upper bridges, D D′, on the front of the instrument being also on the right hand—that is to say, on the plank A—and the tuning-pins for the strings on the lower bridge, E E′, on plank A′ on the left-hand side of Fig. 7, and the hitch-pins on the plank A. The number of strings on each side should be such that the total strain or tension of those on one side is equal, or as nearly equal as conveniently may be, to that of those on the other side; and in the instrument I am now describing the steel springs from top A to middle C are (both inclusive) on the back of the instrument, and are shown in Fig. 5 with their bridges C and C′, and the strings from middle B to lowest A are on the front of the instrument, and are shown, together with their bridges, in Fig. 7, where D and D′ represent the bridges for the steel springs from middle B downward to F, and E E′ the bridges for the covered strings—viz., those from E to lowest A. The bridges D D′ on the front of the instrument are arranged in the manner shown in order to obtain a greater length of string for the notes from middle B to F than would otherwise be obtainable, and also to enable the hammers to be brought onto the right part of the string—viz., about one-ninth of the length of the string from the bridge.

The front and back sounding-boards (marked F and F′, respectively) are placed one under each set of strings, and are attached to each other, with an intervening longitudinal bar at the top, and each one at bottom to a rail provided for it, which rails are each of them attached to the planks A and A′. The bridges C′, D′, and E′ are attached to the sounding-boards, and the bridges C, D, and E are attached to or preferably cast on the iron bars B B′, and the latter bridges will in practice project through openings in, or, in the case of bridge C, beyond, the end of the sounding-boards.

That part of the action consisting of the stickers, hammers, and dampers, together with the frame carrying the action for the notes from top A to middle C, is shown in Fig. 6, a few of the strikers only being shown in full, the striking mechanism being shown more in detail in Fig. 3, which represents a note at rest, and Fig. 9, which represents the same note when it is struck. In these figures, G indicates the key or keys; H, the stickers for transmitting the motion from the key-board to the hammers beneath; I, the hammers; J, the dampers; K, the damper-wire transmitting the motion from the hammer-butts to the damper; L, a lever carrying the damper actuated by the wire K, and which is placed obliquely to enable the damper to clear the hammer, as shown in Fig. 15. The parts immediately connected with the keys consist of the adjusting-lever M, which is faced at the end with leather, where it strikes the projection N on the rod H. O indicates a small rocking lever, called the "set-off" lever. P is a small spring for securing the return of the sticker to its original position, and P′ a leather thong, by which the spring P is attached, and S lead balance-weights or loading, varying in size according to the length of the sticker.

The part of the action consisting of the rods, hammers, and dampers, together with the frame carrying the action for the notes from middle B to lowest A, is shown in Fig. 8, and the action for one of the notes on the bridges D D′—*i. e.*, middle B to F—more in detail in Figs. 10, 11, and 12, of which Fig. 10 represents a note at rest, Fig. 11 the same when struck, and Fig. 12 a front view of the same. In these figures, H indicates the stickers; I, the hammers; J, the dampers; K, the damper-wire. L is the lever carrying the damper, and M is a horizontal bar turning on a horizontal axis, transmitting the motion from the sticker to the hammer-shank. The action for one of the notes on the bridges E E′ is shown in Figs. 13 and 14, and is similar to the action on the back of the instrument, except that part of it is on the opposite side of the sticker, and the same letters of reference apply to the same parts as in Figs. 3 and 9. Fig. 15 is a plan of one of the dampers on the front part.

The loud pedal acts in the usual manner by taking off the dampers, which is accomplished in this instrument by having the part of the frame carrying the damper-bar of the front action, Q, attached to the fixed parts by hinges at R R, and the damper-bar of the back action, Q′, attached by pins, on which it moves, and which are indicated by dotted lines $Q^2 Q^2$. The soft pedal acts in the same manner as in an ordinary piano, except only so far as the different position of the parts necessitates a modification of some of its parts.

It will be seen that the construction of pianos according to my invention permits of an extension of the frame on both sides beyond the length of the key-board, whereby I am enabled to obtain the increased effect due to longer strings.

I claim as my invention and desire to secure by Letters Patent—

1. The combination, in a piano-forte, of the two sounding-boards F F′, inclined toward each other, with frames for supporting the same, the two sets of strings stretched across the sounding-boards and the strikers operating to act on said two sets of strings, substantially as described.

2. The combination, in a piano-forte, of the frame A A′, with the two inclined sounding-boards, the two sets of strings respectively stretched across the said sounding-boards, the key-levers G, the striking-rods H, the short levers intermediate of the key-levers and the striking-rods, and the hammers I, substantially as described.

3. The combination, with the two sounding-boards F F' and the strings stretched across the same, of the two sets of dampers J, the levers L, and the actuating-wires K, constructed and arranged substantially as shown and described.

WILLIAM HENRY SQUIRE.

Witnesses:
NEWNHAM BROWNE,
*Patent Agent, 91 Queen Street, Cheapside, London, E. C.*
JNO. DEAN,
*Clerk to Mess. Scorer & Harris, 17 Gracechurch St., London.*